(12) United States Patent
Wu et al.

(10) Patent No.: US 10,013,730 B2
(45) Date of Patent: Jul. 3, 2018

(54) DISPLAY METHOD AND DISPLAY DEVICE

(71) Applicants: Lenovo (Beijing) Limited, Beijing (CN); Beijing Lenovo Software Ltd., Beijing (CN)

(72) Inventors: Yaqiang Wu, Beijing (CN); Shaowei Chen, Beijing (CN); Jianzhong Zhang, Beijing (CN); Zhepeng Wang, Beijing (CN); Mingxiang Cai, Beijing (CN); Xiaoming Liu, Beijing (CN)

(73) Assignees: LENOVO (BEIJING) LIMITED, Beijing (CN); BEIJING LENOVO SOFTWARE LTD., Beijing (CN)

( * ) Notice: Subject to any disclaimer, the term of this patent is extended or adjusted under 35 U.S.C. 154(b) by 0 days.

(21) Appl. No.: 15/265,984

(22) Filed: Sep. 15, 2016

(65) Prior Publication Data

US 2017/0004596 A1    Jan. 5, 2017

Related U.S. Application Data

(62) Division of application No. 13/819,544, filed as application No. PCT/CN2011/079332 on Sep. 5, 2011, now Pat. No. 9,483,808.

(30) Foreign Application Priority Data

Sep. 6, 2010    (CN) .......................... 2010 1 0274303

(51) Int. Cl.
*G09G 5/00*    (2006.01)
*G06T 1/00*    (2006.01)
(Continued)

(52) U.S. Cl.
CPC .............. *G06T 1/00* (2013.01); *G06F 3/0483* (2013.01); *G06F 3/04817* (2013.01); *G06F 17/30058* (2013.01)

(58) Field of Classification Search
None
See application file for complete search history.

(56) References Cited

U.S. PATENT DOCUMENTS 8,692,763 B1    4/2014 Kim
8,698,765 B1    4/2014 Keller
(Continued)

FOREIGN PATENT DOCUMENTS

CN    1692399 A    11/2005
CN    1770153 A    5/2006
(Continued)

OTHER PUBLICATIONS

International Search Report (with English translation) for International Application No. PCT/CN2011/079332, dated Nov. 24, 2011, 6 pages.
(Continued)

*Primary Examiner* — Kyle Zhai
(74) *Attorney, Agent, or Firm* — Westman, Champlin & Koehler, P.A.

(57) ABSTRACT

The present invention relates to the field of display control processing and provides a display method and a display device. The display method includes: obtaining an object to be displayed; parsing the object to obtain corresponding information of the object; obtaining a media resource corresponding to the corresponding information based on the corresponding information; and displaying the object and presenting the media resource corresponding to the corresponding information. With the present invention, the display effect of the object can be enriched and the user's reading experience can be enhanced.

16 Claims, 3 Drawing Sheets

(51) Int. Cl.
  *G06F 17/30*  (2006.01)
  *G06F 3/0481* (2013.01)
  *G06F 3/0483* (2013.01)

(56) References Cited

U.S. PATENT DOCUMENTS

| | | | |
|---|---|---|---|
| 2002/0062358 A1 | 5/2002 | Kori | |
| 2004/0267793 A1* | 12/2004 | Sato | G11B 27/105 |
| 2005/0156947 A1 | 7/2005 | Sakai et al. | |
| 2007/0030515 A1 | 2/2007 | Adachi | |
| 2007/0037590 A1 | 2/2007 | Lee | |
| 2008/0082497 A1 | 4/2008 | Leblang | |
| 2008/0101762 A1* | 5/2008 | Kellock | G11B 27/031 |
| | | | 386/278 |
| 2008/0170075 A1 | 7/2008 | Muramatsu et al. | |
| 2008/0263449 A1* | 10/2008 | Schwartz | G06T 11/00 |
| | | | 715/723 |
| 2009/0220165 A1 | 9/2009 | Liu et al. | |
| 2010/0214483 A1* | 8/2010 | Gann | G06K 9/00624 |
| | | | 348/578 |
| 2011/0052074 A1 | 3/2011 | Hayaishi | |
| 2011/0167350 A1 | 7/2011 | Hoellwarth | |

FOREIGN PATENT DOCUMENTS

| | | |
|---|---|---|
| CN | 1908951 A | 2/2007 |
| CN | 1913502 A | 2/2007 |
| CN | 101031866 A | 9/2007 |
| EP | 2 109 297 A1 | 10/2009 |
| WO | 2009/094800 A1 | 8/2009 |

OTHER PUBLICATIONS

PTO prosecution mailings for U.S. Appl. No. 13/819,544, filed Feb. 27, 2013, including: Notice of Allowance dated Jul. 26, 2016, 7 pages; Final Rejection dated May 9, 2016, 19 pages; Non-Final Rejection dated Jan. 11, 2016, 18 pages; Final Rejection dated Sep. 15, 2015, 17 pages; Non-Final Rejection dated May 6, 2015, 17 pages; Advisory Action dated Apr. 17, 2015, 3 pages; Final Rejection dated Feb. 26, 2015, 19 pages; and Non-Final Rejection dated Oct. 3, 2014, 19 pages; 119 pages total.

* cited by examiner

DISPLAY METHOD AND DISPLAY DEVICE

CROSS-REFERENCE TO RELATED APPLICATION

This application is a divisional of U.S. application Ser. No. 13/819,544, filed on Feb. 27, 2013, entitled "DISPLAY METHOD AND DISPLAY DEVICE", U.S. application Ser. No. 13/819,544 is a Section 371 National Stage Application of International Application No. PCT/CN2011/079332, filed 5 Sep. 2011 and published as WO 2012/031544 A1 on 15 Mar. 2012, in Chinese, the contents of which are hereby incorporated by reference in their entirety.

TECHNICAL FIELD

The present invention relates to the field of display control processing, and more particularly, to a display method and a display device.

BACKGROUND

Currently, various terminal devices have been widely used. These terminal devices include mobile phone, hand-held computer, tablet computer, electronic book reader (such as e-paper book) and the like. Users can read various data files on these terminal devices, which brings great conveniences in their works and lives.

There is a need to enhance display effects of these terminal devices so as to provide a user with a better reading experience.

SUMMARY

It is an object of the present invention to provide a display method and a display device capable of improving the user's reading experience.

In order to achieve the above object, according to an embodiment of the present invention, a display method is provided. The display method includes: obtaining an object to be displayed; parsing the object to obtain corresponding information of the object; obtaining a media resource corresponding to the corresponding information based on the corresponding information; and displaying the object and presenting the media resource corresponding to the corresponding information.

Preferably, in the above display method, the corresponding information includes at least one of content information of the object and pre-recorded additional information of the object.

Preferably, in the above display method, the media resource includes at least one of an image file, a video file, an audio file and a smell file.

Preferably, in the above display method, obtaining the media resource corresponding to the corresponding information based on the corresponding information includes: determining the media resource corresponding to the corresponding information based on a preset correspondence between the corresponding information and the media resource.

Preferably, in the above display method, displaying the object and presenting the media resource corresponding to the corresponding information includes: presenting the media resource corresponding to the corresponding information while displaying the object; and/or displaying the object, and presenting the media resource corresponding to the corresponding information when a predetermined condition is satisfied.

Preferably, in the above display method, the predetermined condition being satisfied includes a predetermined operation instruction being received.

Preferably, in the above display method, the media resource corresponding to the corresponding information includes an image file, and displaying the object and presenting the media resource corresponding to the corresponding information includes: obtaining a content of the object; and using the image file as a background image, arranging and displaying the content on the background image.

Preferably, in the above display method, arranging and displaying the content on the background image includes: obtaining size information indicating the size of the background image while being displayed in a display area; determining a number of background images to be arranged in the display area based on the size information; determining a layout of the content on the number of background images; and displaying the number of background images in the display area, arranging and displaying the content on the number of background images based on the layout.

Preferably, the above display method further includes: after obtaining the media resource corresponding to the corresponding information: obtaining identification information of the media resource corresponding to the corresponding information; and storing the identification information in the additional information of the object.

According to an embodiment of the present invention, a display device is provided. The display device includes: an object obtaining unit configured to obtain an object to be displayed; a parsing unit configured to parse the object to obtain corresponding information of the object; a resource obtaining unit configured to obtain a media resource corresponding to the corresponding information based on the corresponding information; and a presenting unit configured to display the object and present the media resource corresponding to the corresponding information.

Preferably, in the above display device, the parsing unit is configured to parse a content of the object to obtain content information of the object and/or pre-recorded additional information of the object.

Preferably, the above display device further includes: a storing unit configured to store the media resource which includes at least one of an image file, a video file, an audio file and a smell file.

Preferably, in the above display device, the resource obtaining unit is configured to determine the media resource corresponding to the corresponding information based on a preset correspondence between the corresponding information and the media resource.

Preferably, in the above display device, the presenting unit includes: a first processing unit configured to present the media resource corresponding to the corresponding information while displaying the object; and/or a second processing unit configured to display the object, and present the media resource corresponding to the corresponding information when a predetermined condition is satisfied.

Preferably, the above display device further includes an input unit configured to receive an operation instruction and the second processing unit is configured to present the media resource corresponding to the corresponding information when the input unit receives a predetermined operation instruction.

Preferably, in the above display device, the media resource corresponding to the corresponding information includes an image file, and the presenting unit includes: a content obtaining unit configured to obtain a content of the object; and a layout processing unit configured to use the image file as a background image, arrange and display the content on the background image.

Preferably, in the above display device, the layout processing unit includes: an analyzing unit configured to obtain display size information indicating the size of the background image while being displayed in a display area; a first determining unit configured to determine a number of background images to be arranged in the display area based on the display size information; a second determining unit configured to determine a layout of the content on the number of background images; and a layout unit configured to display the number of background images in the display area, arrange and display the content on the number of background images based on the layout.

Preferably, the above display device further includes a recording unit configured to obtain identification information of the media resource corresponding to the corresponding information and store the identification information in the additional information of the object.

With the display method and the display device according to the embodiments of the present invention, the object to be displayed is displayed and the media resource corresponding to the corresponding information of the object is further presented. By presenting the media resource, the display effect of the object can be enriched, and the user's reading experience can be enhanced. For example, with the embodiments of the present invention, it is possible to select an image file as a background image based on the corresponding information, and display the object on the background image. It is also possible to achieve harmony and unity between the background image and audio effect, smell atmosphere and vibration effect. In this way, the user can be provided with a feeling close to a real reading environment, and the user's reading experience can be enriched.

DETAILED DESCRIPTION OF THE EMBODIMENTS

According to the embodiments of the present invention, a media resource corresponding to an object to be displayed can be automatically provided. The media resource can be presented while or after the object is displayed. In this way, the display effect of the object can be enriched, and the user's reading experience can be enhanced. In the following, the present invention will be further explained with reference to particular embodiments taken in conjunction with the figures.

First Embodiment

Figure 1:
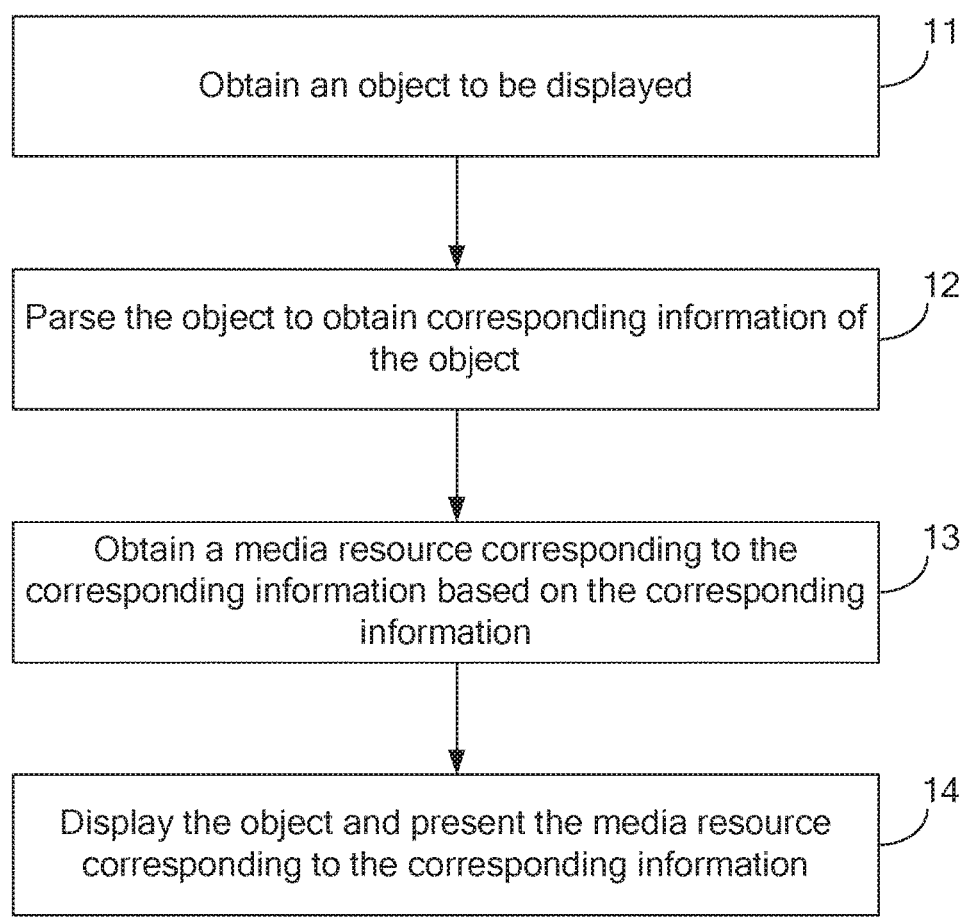
FIG. 1 is a flowchart illustrating a display method according to a first embodiment of the present invention.

Referring to FIG. 1, the display method according to this embodiment of the present invention can be applied in various electronic devices such as computer, PDA, cell phone, MP4 and e-paper book. In particular, the method includes the following steps.

At step 11, an object to be displayed is obtained.

Here, the object to be displayed can be any of various data files, such as e-book file, Word document file and WPS document file, or an icon of an application, file folder or shortcut, such as a desktop icon.

At step 12, the object is parsed to obtain corresponding information of the object.

Here, the corresponding information includes at least one of content information of the object and pre-recorded additional information of the object.

The content information includes information extracted from the content of the object. For an e-book as an example, the content information includes at least one of title of the e-book, keywords in its content and abstract.

The additional information includes at least one of attribute information, identification information and access information of the object. For example, the attribute information includes at least one of publication date, chronological information, publisher or category of the object. The identification information is an identification of the media resource corresponding to the object, which is used to directly identify the media resource corresponding to the object. The access information includes at least one of the time at which the object is last accessed, the accumulative number of times the object has been accessed, the accumulative access time length and the access frequency of the object. Taking an e-book as an example, the attribute information includes the publication date, chronological information, author(s) or category of the content of the e-book. In particular, the category may include any of various categories such as philosophy, natural science, military, economy, literature, art, history, geography and so on. For example, if the content of the e-book is "The Romance of the Three Kingdoms", its author is Guanzhong LUO, its completion time is late Yuan and early Ming dynasty, and it belongs to the category of history. As another example, if the content of the e-book is "A Dream of Red Mansions", its author is Xueqin CAO, its completion time is Qing dynasty, and it belongs to the category of literature.

At step 13, a media resource corresponding to the corresponding information is obtained based on the corresponding information.

Here, the media resource corresponding to the corresponding information can be determined based on a preset correspondence between the corresponding information and the media resource. In particular, the media resource includes at least one of a static or dynamic image file, a video file, an audio file, a smell file and a vibration mode.

At step 14, the object is displayed, and the media resource corresponding to the corresponding information is presented.

In particular, the step of displaying the object and presenting the media resource corresponding to the corresponding information includes: presenting the media resource corresponding to the corresponding information while displaying the object; and/or displaying the object, and presenting the media resource corresponding to the corresponding information when a predetermined condition is satisfied. Herein, the predetermined condition being satisfied includes a predetermined operation instruction being received.

Here, different types of media resources have different forms of presentation. In general, for example, an image file will be displayed as a background of the object. An audio or video file will be played to generate sounds or pictures to achieve corresponding audible or visual effects. For a smell file, the smell corresponding to the smell file will be generated to form a specific atmosphere. For a vibration mode, an electronic device can be triggered to vibrate accordingly.

In the above step 13 according to this embodiment, identification information of the media resource corresponding to the corresponding information can be obtained and stored in the additional information of the object. In this way, when the object is to be displayed again, the identification information of the object can be parsed, and the media resource corresponding to the object can be determined directly based on the identification information.

Figure 2:
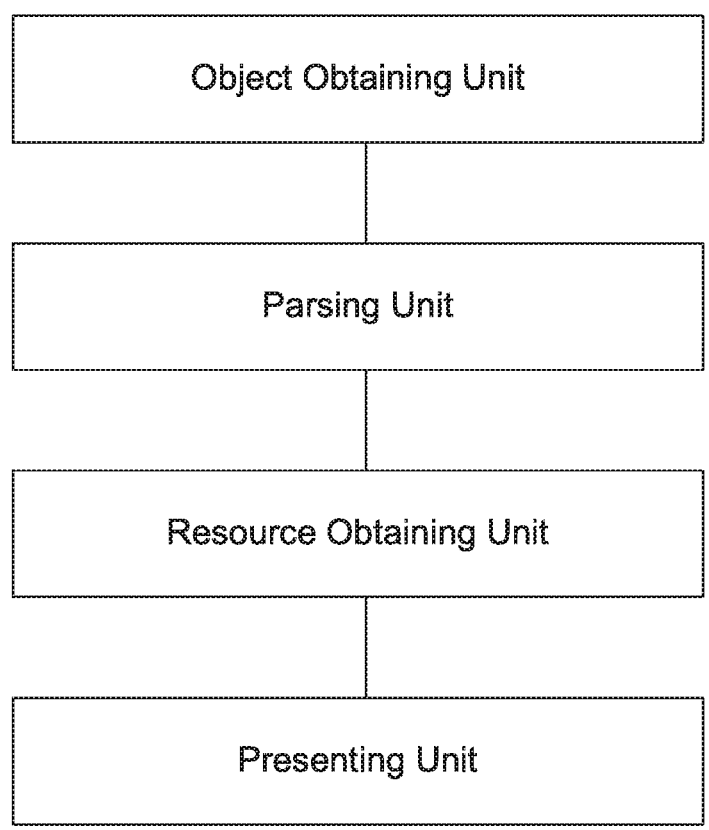
FIG. 2 is a schematic block diagram of a display device according to an embodiment of the present invention.

According to this embodiment, a display device for implementing the above display method is also provided. As shown in FIG. 2, the display device includes: an object obtaining unit configured to obtain an object to be displayed; a parsing unit configured to parse the object to obtain corresponding information of the object; a resource obtaining unit configured to obtain a media resource corresponding to the corresponding information based on the corresponding information; and a presenting unit configured to display the object and present the media resource corresponding to the corresponding information.

Preferably, the parsing unit parses a content of the object to obtain content information of the object and/or pre-recorded additional information of the object.

Preferably, the resource obtaining unit determines the media resource corresponding to the corresponding information based on a preset correspondence between the corresponding information and the media resource.

In a preferred embodiment, the above display device further includes a storing unit configured to store the media resource which includes at least one of an image file, a video file, an audio file, a smell file and a vibration mode.

In a preferred embodiment, the presenting unit includes: a first processing unit configured to present the media resource corresponding to the corresponding information while displaying the object; and/or a second processing unit configured to display the object, and present the media resource corresponding to the corresponding information when a predetermined condition is satisfied.

In a preferred embodiment, the above display device further includes a recording unit configured to obtain identification information of the media resource corresponding to the corresponding information and store the identification information in the additional information of the object.

It can be seen from above that, with this embodiment, the object to be displayed is displayed and the media resource corresponding to the corresponding information of the object is further presented. By presenting the media resource, the display effect of the object can be enriched and the user's reading experience can be enhanced.

Next, the present invention will be further explained with reference to even more detailed embodiments.

Second Embodiment

In this embodiment, the object is an e-book file, and the media resource is an image file as an example. An e-book file is a file obtained by recording information such as text, image, sound and video digitally using computer techniques.

Figure 3:
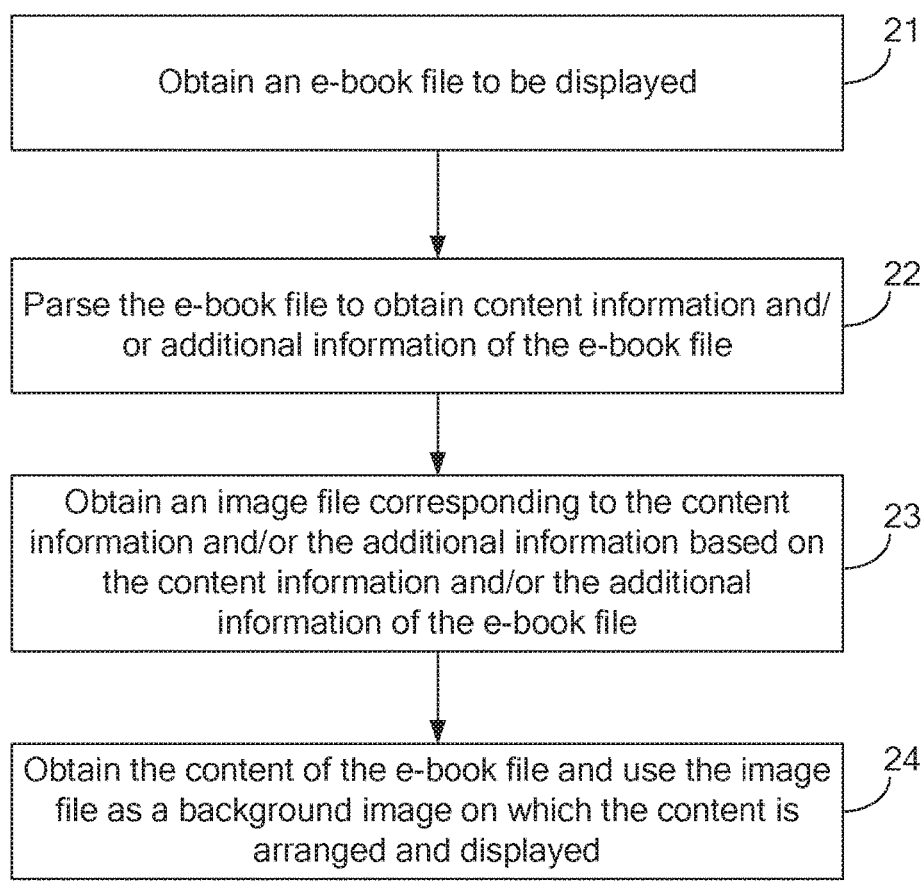
FIG. 3 is a flowchart illustrating a display method according to a second embodiment of the present invention

FIG. 3 shows the display method according to this embodiment. The display method can be applied in an electronic device having a display function. In particular, the display method includes the following steps.

At step 21, an e-book file to be displayed is obtained.

Here, the e-book file to be displayed can be a locally stored file, a file downloaded from a network or another device, or an on-line file read over a network.

At step 22, the e-book file is parsed to obtain content information and/or additional information of the e-book file.

Here, the e-book file can be parsed to obtain the content of the e-book file. Then the content information can be extracted from the content of the e-book. The e-book file can be parsed to obtain pre-recorded additional information of the e-book file.

At step 23, an image file corresponding to the content information and/or the additional information is obtained based on the content information and/or the additional information of the e-book file.

Here, image files corresponding to different content information can be preset. Then, the image file corresponding to the content information can be determined based on the content information of the e-book file.

The content information can be for example the title of the book. In this case, an image file corresponding to the title of the e-book can be preset. For example, for an e-book titled "Strategies of the Warring States", an image file containing images of bamboo slips can be set as its corresponding image file. For an e-book titled "Das Kapital", an image file containing images of ordinary paper can be set as its corresponding image file. For an e-book titled "Fu Lei's Letters", an image file containing images of letter paper can be set as its corresponding image file.

Here, an image file corresponding to the attribute information or the access information in the content information can be preset. Then, the image file corresponding to the content information can be determined based on the content information of the e-book file.

The attribute information can be for example the publication date or the completion time of an e-book and a corresponding image file can be preset. For example, for an e-book "Strategies of the Warring States" which was completed in the warring states period, an image file containing images of bamboo slips can be set as its corresponding image file. For an e-book "Romance of the West Chamber" which is a traditional love fiction under the category of literature, an image file containing silk paper can be set as its corresponding image file.

As another example, the attribute information can be the accumulative access time length of an e-book and a corresponding image file can be preset. For example, different image files can be set for different accumulative access time lengths. For a longer accumulative access time length, an image file containing images which show a severer staleness or contamination is used, so as to provide the user with a feeling that the e-book become stale with the increase of the accumulative access time length. In this way, the user will have a reading experience close to that of reading a real paper book.

At step 24, the content of the e-book file is obtained and the image file is used as a background image on which the content is arranged and displayed.

There are various layouts depending on the size of the background image while being displayed in a display area of the electronic device. For example, when only one background image can be displayed in the display area, the content can be arranged and displayed directly on the background image. When two or more background images can be displayed in the display area (e.g., when an image of bamboo slips is used as the background image, since the image of bamboo slips usually has a very small aspect ratio, and more than one image of bamboo slips can be displayed in the display area), the above step 24 in which the content is arranged and displayed on the background image includes: obtaining size information indicating the size of the background image while being displayed in a display area; determining a number of background images to be arranged in the display area based on the display size information; determining a layout of the content on the number of background images; and displaying the number of background images in the display area, arranging and displaying the content on the number of background images based on the layout.

Here, when determining the layer of the content on the number of background images, if there is a file (such as a picture file or a table file) in the content whose display area exceeds one background image, the file can be scaled down such that the resulting file can be displayed on one background image. Alternatively, this file can be divided into multiple smaller files which can be displayed on multiple background images, respectively.

In this way, multiple images of bamboo slips can be arranged in the display area. Then the content of the e-book file can be laid and displayed on these images of bamboo slips.

Accordingly, a display device for implementing the above display method is also provided. The display device includes: an object obtaining unit configured to obtain an object to be displayed; a parsing unit configured to parse the object to obtain corresponding information of the object; a resource obtaining unit configured to obtain a media resource corresponding to the corresponding information based on the corresponding information; and a presenting unit configured to display the object and present the media resource corresponding to the corresponding information.

As a preferred embodiment, when the media resource corresponding to the corresponding information includes a first image file, the presenting unit includes: a content obtaining unit configured to obtain a content of the object; and a layout processing unit configured to use the image file as a background image, arrange and display the content on the background image.

Here, when there is a file (such as a picture file or a table file) in the content whose display area exceeds one background image, the layout processing unit can scale down the file in the layout process such that the resulting file can be displayed on one background image. Alternatively, the layout processing unit can divide this file into multiple smaller files which can be displayed on multiple background images, respectively.

Preferably, the layout processing unit includes: an analyzing unit configured to obtain size information indicating the size of the background image while being displayed in a display area; a first determining unit configured to determine a number of background images to be arranged in the display area based on the size information; a second determining unit configured to determine a layout of the content on the number of background images; and a composing unit configured to display the number of background images in the display area, arrange and display the content on the number of background images based on the layout.

In this embodiment, an image file corresponding to an e-book file can be determined based on the content information or the additional information of the e-book file. Then, this image file can be used as a background on which the content of the e-book file can be laid and displayed. In this embodiment, with the background image corresponding to the content information or the additional information, it is possible to automatically update the presented book material (i.e., background image) based on the read content and the reading history. In this way, the user will have a reading experience close to that of reading a real paper book.

Third Embodiment

In this embodiment, the object is an icon and the media resource is an image file as an example. An icon can be an icon of an application, file folder or shortcut, such as a desktop icon on the desktop of an electronic device.

The display method according to this embodiment can be applied in an electronic device having a display function. In particular, the display method includes the following steps of: obtaining an icon to be displayed; and parsing the icon to obtain additional information of the icon.

In this embodiment, the additional information is a pre-recorded time at which the icon is last accessed.

Based on the time at which the icon is last accessed, an image file corresponding to the time at which the icon is last accessed is obtained.

Here, an image file corresponding to the time length from the time at which the icon is last accessed to the current time can be preset. Thus, the image file corresponding to the icon can be determined based on the time length from the time at which the icon is last accessed to the current time. For example, different image files can be set for different time lengths from the time at which the icon is last accessed to the current time. For a longer time length from the time at which the icon is last accessed to the current time, images contained in the image file show a severer dust accumulation. In this way, the user is provided with an intuitive visual feeling close to that of a real reading environment in which dust is usually accumulated on books or documents which are seldom read.

The display method according to this embodiment further includes: using the image file as a background on which the icon is displayed. The use of the background applies dust accumulation to the icon. Here, the accumulated dust increases with the increase of the time length from the time at which the icon is last accessed to the current time.

In this embodiment, the image file corresponding to the icon is determined based on the time at which the icon is last accessed. Then, the image file is used as a background on which the icon is displayed. With the background image corresponding to the icon, the user's reading experience can be enhanced.

Fourth Embodiment

In this embodiment, the object is an e-book file and the media resource includes an image file and an audio file as an example.

The display method according to this embodiment can be applied in an electronic device having a display function. In particular, the display method includes the following steps of: obtaining an e-book file to be displayed; parsing the e-book file to obtain content information and/or additional information of the e-book file; and obtaining an image file, a first audio file and a second audio file corresponding to the content information and/or the additional information based on the content information and/or the additional information of the e-book file.

Here, image files and audio files corresponding to different content information can be preset. In this way, the image file and the audio files corresponding to the content information can be determined based on the content information of the e-book file.

In this embodiment, it is assumed that the e-book file to be displayed is "Strategies of the Warring States". Its corresponding image file containing images of bamboo slips can be preset. Additionally, a first audio file and a second audio file corresponding to the e-book file are also provided. The first audio file, when played, can generate a sound of bamboo slip being opened. The second audio file, when played, can generate a sound of bamboo slip being flipped.

The display method according to this embodiment further includes the following steps.

The content of the e-book file is obtained. The image file is used as a background image on which the content is arranged and displayed. While the content is displayed, the first audio file is played to generate a sound of bamboo slip being opened, so as to achieve harmony and unity between visual and auditory senses.

When a predetermined condition is satisfied, the second audio file is played to generate a sound of bamboo slip being flipped. Here, the predetermined condition being satisfied includes a predetermined operation instruction being received, such as a flipping instruction input by the user via key-pressing action or gesture.

In the above step for obtaining the image file and the first and second audio files, this embodiment can further obtain a vibration mode corresponding to the content information and/or the additional information based on the content information and/or the additional information of the e-book file. Then, when the content of the e-book file is displayed, a vibration corresponding to the vibration mode is produced. When a predetermined condition is satisfied, a vibration corresponding to the vibration mode is produced, so as to create a feeling of vibration produced when bamboo slips are opened or flipped, thereby achieving harmony and unity among visual, auditory and tactile senses.

Accordingly, a display device for implementing the above display method is also provided. The display device includes: an object obtaining unit configured to obtain an object to be displayed; a parsing unit configured to parse the object to obtain corresponding information of the object; a resource obtaining unit configured to obtain a media resource corresponding to the corresponding information based on the corresponding information; and a presenting unit configured to display the object and present the media resource corresponding to the corresponding information.

As a preferred embodiment, the above presenting unit includes: a first processing unit configured to present the media resource corresponding to the corresponding information while displaying the object; and/or a second processing unit configured to display the object, and present the media resource corresponding to the corresponding information when a predetermined condition is satisfied.

Preferably, the above display device further includes an input unit configured to receive an operation instruction and the second processing unit is further configured to present the media resource corresponding to the corresponding information when the input unit receives a predetermined operation instruction.

With this embodiment, it is possible to achieve harmony and unit between the background and the audio effect and/or the vibration effect, so as to provide the user with a feeling close to a real reading environment.

While the embodiments of the present invention have been described, it should be noted that a number of improvements and modifications can be made by those skilled in the art without departing from the principle of the present invention. These improvements and modifications are encompassed by the scope of the present invention.

What is claimed is:

1. A display method implemented in an electronic apparatus, comprising:
    obtaining, by a processor of the electronic apparatus, an icon to be displayed;
    parsing, by the processor, the icon to obtain information of the icon;
    obtaining, by the processor, a media resource corresponding to the information; and
    displaying, by a display unit of the electronic apparatus under the control of the processor, the icon and presenting the media resource as background;
    wherein the information of the icon comprises pre-recorded additional information of the icon, and the additional information comprises a pre-recorded time at which the icon is last accessed; and
    the media resource is presented to reflect a time length from the pre-recorded time at which the icon is last accessed to a current time;
    wherein the media resource comprises an image file, and
    displaying the icon and presenting the media resource as background comprises:
    obtaining a content of the icon;
    using the image file as a background image;
    obtaining size information that indicates the size of the background image while being displayed in a display area;
    determining a number of background images to be arranged in the display area based on the size information;
    determining a layout of the content on the number of background images; and
    displaying the number of background images in the display area, arranging and displaying the content on the number of background images based on the layout.

2. The display method of claim 1, wherein
the information further comprises content information of the icon.

3. The display method of claim 1, wherein
the media resource comprises at least one of an image file, a video file, an audio file and a smell file.

4. The display method of claim 1, wherein
obtaining the media resource based on the information comprises:
    determining the media resource based on a preset correspondence between the information and the media resource.

5. The display method of claim 1, wherein
displaying the icon and presenting the media resource comprises:
    presenting the media resource while displaying the icon; and/or
    displaying the icon, and presenting the media resource when a predetermined condition is satisfied.

6. The display method of claim 1, wherein the icon is an icon for an application, a folder or a shortcut.

7. The display method of claim 1, further comprising:
after obtaining the media resource based on the information,
    obtaining identification information of the media resource; and
    storing the identification information in the additional information of the icon.

8. The display method of claim 1, wherein obtaining the media resource based on the information comprises obtaining an image file corresponding to a time length from the pre-recorded time at which the icon is last accessed to a current time.

9. An electronic apparatus comprising:
a processor,
a display unit, and
a storage device that stores an icon and information of the icon,
wherein the processor is configured to:
obtain the icon from the storage device for display;
parse the icon to obtain, from the storage device, the information of the icon;
obtain, a media resource corresponding to the information; and
control the display unit to display the icon and present the media resource as background;
wherein the information of the icon comprises pre-recorded additional information of the icon, and the additional information comprises a pre-recorded time at which the icon is last accessed; and
the media resource is presented to reflect a time length from the pre-recorded time at which the icon is last accessed to a current time;
wherein the media resource comprises an image file; and
where the processor controls the display unit to display the icon and present the media resource as background by:
obtaining a content of the icon,
using the image file as a background image,
obtaining size information that indicates a size of the background image while being displayed in a display area;
determining a number of background images to be arranged in the display area based on the size information;
determining a layout of the content on the number of background images; and
determining the number of background images in the display area, arranging and displaying the content on the number of background images based on the layout.

10. The electronic apparatus of claim 9, wherein the processor further parses a content of the icon to obtain content information of the icon.

11. The electronic apparatus of claim 9, further comprising the storage device further stores the media resource.

12. The electronic apparatus of claim 9, wherein the processor determines the media resource based on a preset correspondence between the information and the media resource.

13. The electronic apparatus of claim 9, wherein the processor
presents the media resource while displaying the icon; and/or
displays the icon, and presents the media resource when a predetermined condition is satisfied.

14. The electronic apparatus of claim 13, further comprising:
an input device configured to receive an operation instruction,
wherein the processor presents the media resource when the input unit receives a predetermined operation instruction.

15. The electronic apparatus of claim 9, wherein the processor further obtains identification information of the media resource and stores the identification information in the additional information of the icon.

16. The electronic apparatus of claim 9, wherein the processor obtains the media resource corresponding to the information by obtaining an image file corresponding to a time length from the pre-recorded time at which the icon is last accessed to a current time.

* * * * *